United States Patent
Watanabe et al.

(10) Patent No.: US 12,227,099 B2
(45) Date of Patent: Feb. 18, 2025

(54) POWER SUPPLY DEVICE, NON-TRANSISTORY COMPUTER READABLE STORAGE MEDIUM, AND POWER SUPPLY CONTROL SYSTEM

(71) Applicant: TOYOTA JIDOSHA KABUSHIKI KAISHA, Toyota (JP)

(72) Inventors: Yoshimasa Watanabe, Sunto-gun (JP); Kizuku Yamada, Susono (JP); Masaki Ito, Toyota (JP); Sakiko Yoshida, Mishima (JP); Yuki Takahashi, Susono (JP); Tomonori Imamura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 732 days.

(21) Appl. No.: 17/501,707

(22) Filed: Oct. 14, 2021

(65) Prior Publication Data

US 2022/0212558 A1    Jul. 7, 2022

(30) Foreign Application Priority Data

Jan. 6, 2021    (JP) .................... 2021-001117

(51) Int. Cl.
| B60L 53/60 | (2019.01) |
| B60L 53/12 | (2019.01) |
| B60L 53/14 | (2019.01) |
| B60L 53/53 | (2019.01) |
| H02J 50/12 | (2016.01) |

(52) U.S. Cl.
CPC ............. B60L 53/60 (2019.02); B60L 53/12 (2019.02); B60L 53/14 (2019.02); B60L 53/53 (2019.02); H02J 50/12 (2016.02)

(58) Field of Classification Search
CPC .......... B60L 53/60; B60L 53/12; B60L 53/53; B60L 53/14; H02J 50/12
USPC ........................................................ 320/108
See application file for complete search history.

(56) References Cited

U.S. PATENT DOCUMENTS

| 2010/0094496 | A1* | 4/2010 | Hershkovitz | ........... B60L 50/66 701/22 |
| 2013/0002190 | A1* | 1/2013 | Ogura | .................... H01M 10/46 320/101 |
| 2013/0176000 | A1* | 7/2013 | Bishop | ...................... H02J 7/00 320/149 |
| 2018/0354383 | A1* | 12/2018 | Namou | ................. B60L 53/124 |
| 2019/0168631 | A1 | 6/2019 | Cho | |

FOREIGN PATENT DOCUMENTS

| CN | 107176040 A | * | 9/2017 | ............. B60L 50/40 |
| CN | 107719141 A | * | 2/2018 | |
| CN | 207010322 U | * | 2/2018 | |

(Continued)

*Primary Examiner* — Suresh Memula
(74) *Attorney, Agent, or Firm* — Oliff PLC (57) ABSTRACT

There is provided a power supply device that supplies electric power to a motor-driven vehicle including a power storage device through one of wireless supply of electric power using a wireless system and wired supply of electric power using a wired system to the motor-driven vehicle. The power supply device includes a processor configured to perform control for recommending the supply of electric power using the wired system as a power supply system for the motor-driven vehicle when information on a disaster is received.

20 Claims, 7 Drawing Sheets

(56) References Cited

FOREIGN PATENT DOCUMENTS

| CN | 107985103 | A | * | 5/2018 | |
|---|---|---|---|---|---|
| CN | 109672254 | A | * | 4/2019 | ....... G01R 19/16542 |
| CN | 110103752 | A | * | 8/2019 | |
| CN | 110370959 | A | * | 10/2019 | ............. B60L 53/10 |
| CN | 110696670 | A | * | 1/2020 | |
| CN | 111016717 | A | * | 4/2020 | ............. B60L 53/60 |
| CN | 111186333 | A | * | 5/2020 | ............. B60L 53/60 |
| CN | 213402500 | U | * | 6/2021 | |
| CN | 214607152 | U | * | 11/2021 | |
| CN | 114973599 | A | * | 8/2022 | ............. G06F 3/147 |
| CN | 117154962 | A | * | 12/2023 | |
| CN | 117183775 | A | * | 12/2023 | |
| CN | 117377300 | A | * | 1/2024 | |
| JP | 2013-179723 | A | | 9/2013 | |
| JP | 2019-083647 | A | | 5/2019 | |
| JP | 2019-531680 | A | | 10/2019 | |
| JP | 2020068633 | A | * | 4/2020 | ............ B60L 15/007 |
| KR | 20180046527 | A | * | 5/2018 | |
| KR | 20190072706 | A | * | 6/2019 | |
| WO | WO-2018030830 | A1 | * | 2/2018 | ............. B60L 50/50 |
| WO | WO-2019018105 | A1 | * | 1/2019 | ............. B60L 53/124 |
| WO | 2019/087754 | A1 | | 5/2019 | |
| WO | WO-2019098648 | A1 | * | 5/2019 | ............. B60L 53/12 |
| WO | WO-2019146261 | A1 | * | 8/2019 | ............. B60R 25/24 |

\* cited by examiner

SINCE DISASTER HAS OCCURRED, CHARGING USING WIRED SYSTEM IS RECOMMENDED

FIG. 7

POWER SUPPLY DEVICE, NON-TRANSISTORY COMPUTER READABLE STORAGE MEDIUM, AND POWER SUPPLY CONTROL SYSTEM

CROSS-REFERENCE TO RELATED APPLICATION

This application claims priority to Japanese Patent Application No. 2021-001117 filed on Jan. 6, 2021, incorporated herein by reference in its entirety.

BACKGROUND

1. Technical Field

The present disclosure relates to a power supply device, a power supply program, and a power supply control system.

2. Description of Related Art

Japanese Unexamined Patent Application Publication (Translation of PCT Application) No. 2019-531680 (JP 2019-531680 A) discloses a charging device that identifies which of a wired charging system and a wireless charging system is employed by a vehicle to which electric power is supplied in supplying electric power to the vehicle from an external power source and performs supply of electric power to the vehicle by switching the charging system to the identified system.

SUMMARY

When a disaster occurs, it is necessary to charge a vehicle within a limited time.

The present disclosure provides a power supply device, a power supply program, and a power supply control system that can efficiently charge a vehicle when a disaster occurs.

A power supply device according to the present disclosure is a power supply device that supplies electric power to a motor-driven vehicle including a power storage device through one of wireless supply of electric power using a wireless system and wired supply of electric power using a wired system. The power supply device includes a processor configured to perform control for recommending the supply of electric power using the wired system as a power supply system for the motor-driven vehicle when information on a disaster is received.

A power supply program according to the present disclosure is a power supply program causing a processor of a power supply device, which supplies electric power to a motor-driven vehicle including a power storage device through one of wireless supply of electric power using a wireless system and wired supply of electric power using a wired system e, to perform control for recommending the supply of electric power using the wired system as a power supply system for the motor-driven vehicle when information on a disaster is received.

A power supply control system according to the present disclosure is a power supply control system including: a motor-driven vehicle that includes a power storage device; and a power supply device that supplies electric power to the motor-driven vehicle through one of wireless supply of electric power using a wireless system and wired supply of electric power using a wired system and includes a processor configured to perform control for recommending the supply of electric power using the wired system as a power supply system for the motor-driven vehicle when information on a disaster is received.

According to the present disclosure, it is possible to efficiently charge a vehicle when a disaster occurs.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the accompanying drawings. In the drawings mentioned in the following embodiments, the same or corresponding elements will be referred to by the same reference signs. The present disclosure is not limited to the following embodiments.

First Embodiment

Figure 1:
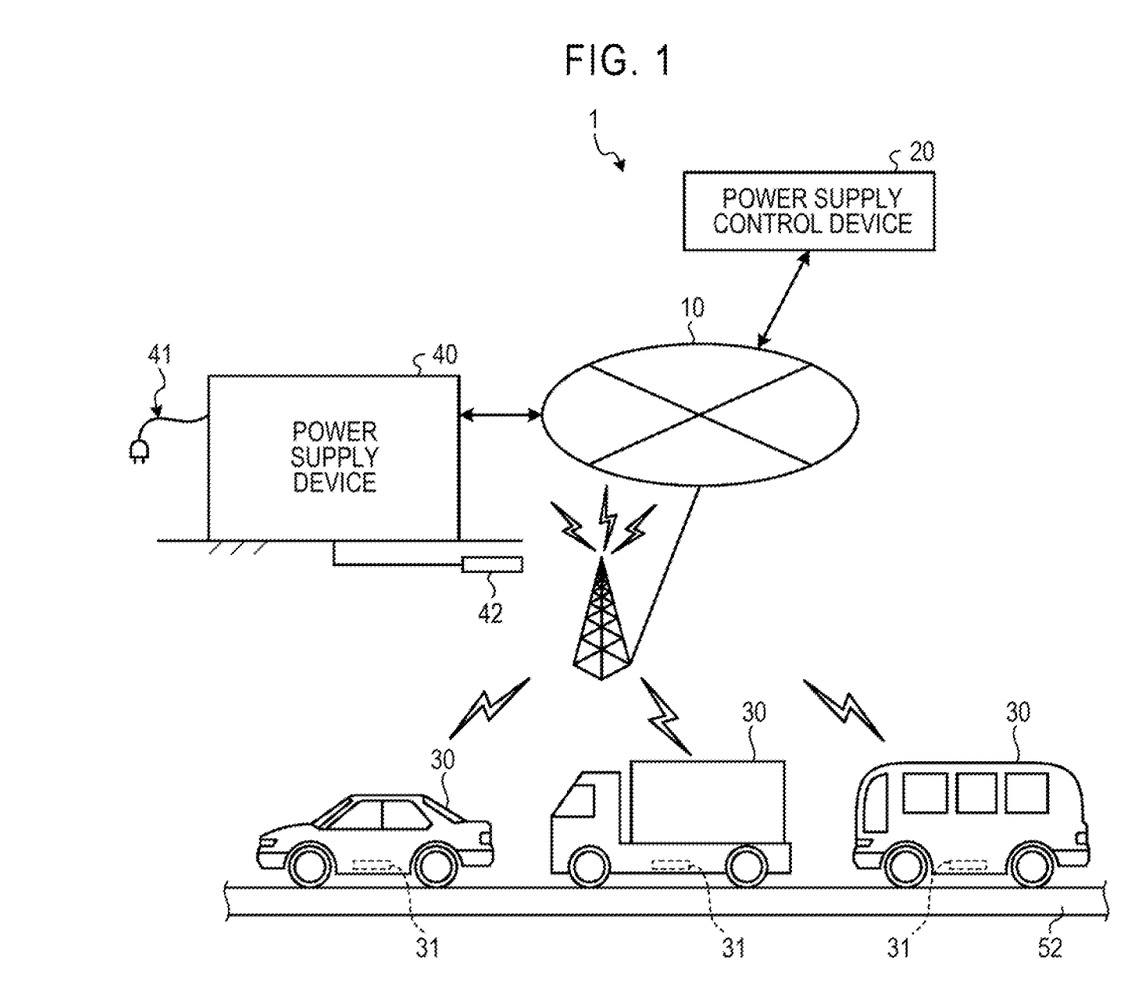
FIG. 1 is a diagram schematically illustrating a power supply control system according to a first embodiment.
Figure 2:
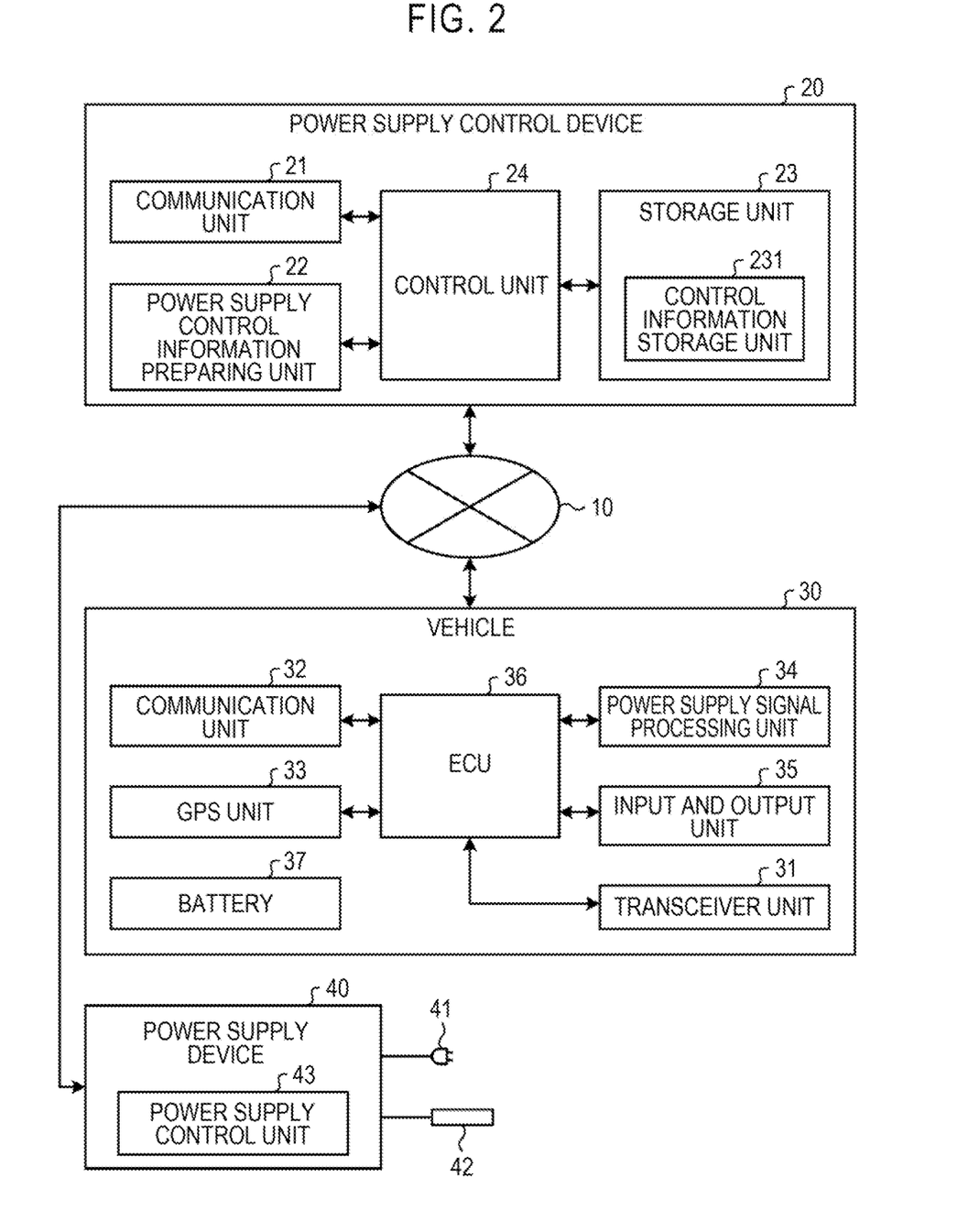
FIG. 2 is a block diagram illustrating a configuration of the power supply control system according to the first embodiment.

First, a power supply control system according to a first embodiment will be described below. FIG. 1 is a diagram schematically illustrating a power supply control system including a power supply device according to the first embodiment. FIG. 2 is a block diagram illustrating a configuration of the power supply control system according to the first embodiment.

The power supply control system 1 includes a power supply control device 20, vehicles 30, and a power supply device 40. In the power supply control system 1 according to this embodiment, the power supply control device 20, the vehicles 30, and the power supply device 40 are communicatively connected to each other via a network 10. The network 10 is constituted by an Internet network or a mobile phone network that allows the power supply control device 20, the vehicles 30, and the power supply device 40 to communicate with each other. In this embodiment, it is assumed that the vehicles 30 are motor-driven vehicles that can travel in a hybrid travel mode or an EV travel mode. In each vehicle 30, a battery 37 is charged with electric power supplied from a wired power supply unit 41 or a wireless power supply unit 42 which is managed by the power supply device 40.

The power supply control device 20 transmits acquired information on power supply control (hereinafter referred to as power supply control information) corresponding to a disaster to a power supply device 40 which is provided in the corresponding area.

The power supply control device 20 includes a communication unit 21, a power supply control information preparing unit 22, a storage unit 23, and a control unit 24. The power supply control device 20 is constituted by one or more computers or the like including a central processing unit (CPU), a field-programmable gate array (FPGA), a read only memory (ROM), and a random access memory (RAM).

The communication unit 21 accesses the network 10 and communicates with the vehicles 30 and the power supply device 40. The communication unit 21 includes a receiver unit that receives information on the vehicles 30 from the power supply device 40 and a transmitter unit that transmits various types of information including a power supply signal to the vehicle 30 which is a transmission target. The communication unit 21 receives, for example, information on a disaster which is transmitted from a disaster control center of a central government or a local government.

The power supply control information preparing unit 22 prepares disaster information based on the information on the disaster acquired from the outside. The disaster information includes information on a disaster which is predicted to occur in the future in addition to a disaster which has occurred already.

The storage unit 23 includes a computer-readable recording medium, and various programs and various types of data are stored therein such that they can be written and read. This recording medium includes a storage medium such as an optical disc, a flash memory, or a magnetic disk and a drive device of the corresponding storage medium.

The storage unit 23 includes a control information storage unit 231. The control information storage unit 231 stores information on power supply control of the power supply device 40 when a disaster has occurred.

The control unit 24 comprehensively controls operations of the constituent units of the power supply control device 20.

The configuration of a vehicle 30 will be described below with reference to FIGS. 1 and 2. The vehicle 30 includes a transceiver unit 31, a communication unit 32, a Global Positioning System (GPS) unit 33, a power supply signal processing unit 34, an input and output unit 35, and an electronic control unit (ECU) 36. The battery 37 that supplies electric power to the constituent units is provided in the vehicle 30. The battery 37 is configured to be rechargeable. A component that controls the vehicle 30 is constituted by one or more computers including a CPU, an FPGA, a ROM, and a RAM, or the like.

The transceiver unit 31 serves as a receiver unit that receives a power supply signal from the power supply device 40 and serves as a transmitter unit that transmits its information to the power supply device 40 using electromagnetic waves. The receiver unit and the transmitter unit that transmits its information to the power supply device 40 may not be unified into a single body, but may be provided separately.

The communication unit 32 communicates with the power supply control device 20 by wireless communication via the network 10. The communication unit 32 receives operation support information for supporting the operation of the vehicle 30 from the power supply control device 20. The operation support information includes road traffic information such as information on regulations or congestion. The communication unit 32 may be configured to transmit its information to the power supply device 40 connected thereto.

The GPS unit 33 receives radio waves from GPS satellites and detects the position of the vehicle 30. The detected position is output to the outside or stored in a storage unit as position information of the vehicle 30.

The power supply signal processing unit 34 converts a power supply signal received from the power supply device 40 to electric power and supplies the converted electric power to the battery 37. The power supply signal is a wireless power supply signal which is received by the transceiver unit 31. When the power supply device 40 is connected in a wired manner, electric power supplied therefrom is input to the battery 37.

The input and output unit 35 includes a touch panel display, a speaker, and a microphone. The input and output unit 35 is configured to output predetermined information such as information on operation support by displaying text, figures, or the like on a screen of the touch panel display or outputting sound from the speaker under the control of the ECU 36. The input and output unit 35 is configured to input predetermined information to the ECU 36 by allowing a user of the vehicle 30 or the like to operate the touch panel display or to utter speech to the microphone.

The ECU 36 is constituted by an information processing device such as a microcomputer including a CPU, an FPGA, a ROM, and a RAM. The ECU 36 comprehensively controls electrical operations of the constituents of the vehicle 30. The ECU 36 is configured to perform arithmetic operations using data which is input or data which is stored in advance and a program and to output the results of operations as a control command signal.

The vehicle 30 includes a storage unit including a storage medium such as a hard disk or a semiconductor memory and a drive device of such a storage medium and a sensor that detects an object which gets closer in the traveling direction. An operating system (OS) and programs of various applications required for the ECU 36 to comprehensively control the operations of the constituents of the vehicle 30 are stored in the storage unit.

The vehicle 30 includes a drive mechanism and an operation mechanism for driving the vehicle 30. Specifically, the vehicle 30 includes a power train and driving wheels as the drive mechanism. The power train includes a power source that generates a driving force and outputs the driving force from an output shaft and a power transmission mechanism that transmits the driving force output from the power source to the driving wheels 2. The operation mechanism includes a shift lever and an accelerator pedal. When the vehicle 30 travels autonomously, the constituents thereof operate in accordance with instruction signals under the control of the ECU 36.

The power supply device 40 includes a wired power supply unit 41, a wireless power supply unit 42, and a power supply control unit 43. The power supply device 40 is constituted by one or more computers including a CPU, an FPGA, a ROM, and a RAM.

The wired power supply unit 41 includes a connector that is connected to the vehicle 30. The wired power supply unit 41 transmits a power supply signal to the vehicle 30 in a state in which the connector is connected to the vehicle 30.

The wireless power supply unit 42 transmits a power supply signal to the vehicle 30 by wirelessly communicating with the transceiver unit 31 of the vehicle 30. Wireless charging between the vehicle 30 and the power supply device 40 is performed through transmission of the power supply signal from the wireless power supply unit 42. The transceiver unit 31 provided in the vehicle 30 and the wireless power supply unit 42 provided in the power supply device 40 communicate with each other to supply a power supply signal to the vehicle 30. The transceiver unit 31 and the power supply device 40 each include, for example, a coil, a switching circuit, and a rectification and smoothing circuit and transmit and receive a power supply signal using a magnetic resonance system. Accordingly, the vehicle 30 and the power supply device 40 communicate in a wireless manner. In this embodiment, an example in which supply of electric power and transmission of information are performed using electromagnetic waves is described, but a configuration for supply of electric power and transmission of information using light may be employed.

The power supply control unit 43 comprehensively controls the operations of the constituents of the power supply device 40. When a disaster occurs and power supply control information for controlling supply of electric power in the disaster is received from the power supply control device 20, the power supply control unit 43 controls the power supply device 40 based on the power supply control information.

In this embodiment, the power supply device 40 has a detection function of detecting a vehicle 30 which is located on the power supply device 40 and a reception function of receiving information of the vehicle 30. The detection function and the reception function are realized, for example, using a roof antenna. For example, the detection function involves transmitting a detection signal to the power supply device 40 when a vehicle 30 is detected. When a vehicle can be detected using a power supply coil or the like, the coil may be used for detection as well as for supply of electric power.

Figure 3:
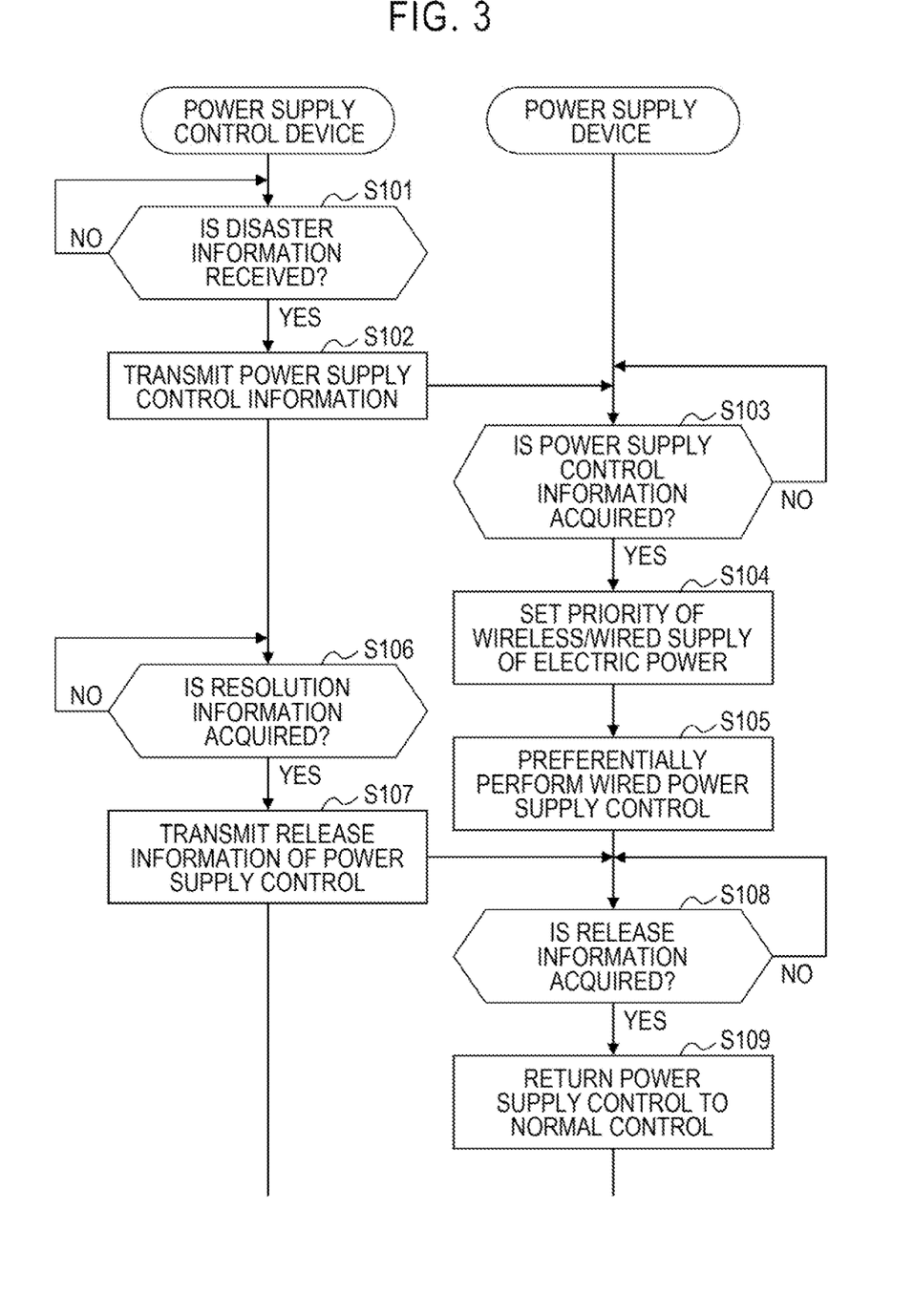
FIG. 3 is a sequence diagram illustrating a power supply control routine which is performed by the power supply control system according to the first embodiment.

A power supply control routine which is performed by the power supply control system 1 will be described below with reference to FIG. 3. FIG. 3 is a sequence diagram illustrating the power supply control routine which is performed by the power supply control system according to the first embodiment.

First, the power supply control device 20 prepares power supply control information when information on a disaster is acquired (Step S101). The power supply control information which is prepared here includes a type or a scale of the disaster and information for recommending supply of electric power using a wired system from the power supply device which is set for the disaster.

The power supply control device 20 transmits power supply control information to the power supply device 40 which is installed in the corresponding area (Step S102).

On the other hand, the power supply device 40 determines whether power supply control information has been received (Step S103). When power supply control information has not been received (Step S103: NO), the power supply control unit 43 repeatedly determines whether power supply control information has been received. On the other hand, when it is determined that power supply control information has been received (Step S103: YES), the power supply control unit 43 causes the routine to proceed to Step S104.

In Step S104, the power supply control unit 43 performs a setting for prioritizing supply of electric power using a wireless/wired system based on the power supply control information. In the first embodiment, the setting for prioritizing supply of electric power using a wired system is performed. After this setting has been performed, the power supply control unit 43 controls the supply of electric power using a wired system (Step S105). Accordingly, when the power supply device 40 supplies electric power to the vehicle 30, a process of performing the supply of electric power using a wired system is performed. For example, when the vehicle 30 cannot cope with the wired system, the supply of electric power using the wireless system may be permitted or the supply of electric power may be set to be rejected.

Thereafter, the control unit 24 determines whether resolution information of the disaster has been received (Step S106). Here, when it is determined that the resolution information has not been received (Step S106: NO), the control unit 24 repeatedly ascertains whether the resolution information has been received. On the other hand, when it is determined that the resolution information has been received (Step S106: YES), the control unit 24 causes the routine to proceed to Step S107.

In Step S107, the control unit 24 transmits release information for releasing the power supply control due to the disaster to the power supply device 40.

On the other hand, the power supply control unit 43 determines whether the release information has been received (Step S108). When it is determined that the release information has not been received (Step S108: NO), the power supply control unit 43 repeatedly ascertains whether the release information has been received. On the other hand, when it is determined that the release information has been received (Step S108: YES), the power supply control unit 43 causes the routine to proceed to Step S109.

In Step S109, the power supply control unit 43 restores the power supply control to a normal state and releases the control for prioritizing the wired system from the power supply device 40. The normal state which is mentioned herein represents a state in which a disaster does not occur or occurrence of a disaster is not predicted. In the normal state, both the wired system and the wireless system can be used without either being prioritized.

In the aforementioned first embodiment, when a disaster occurs, the supply of electric power using the wired system is prioritized and supply of electric power to a vehicle 30 is performed using the wired system. In performing supply of electric power to a vehicle 30, transmission efficiency of a power supply signal in the supply of electric power using the wired system is higher than that in the supply of electric power using the wireless system. Accordingly, it is possible to increase a residual power storage capacity of a vehicle 30 in a shorter time in comparison with a case in which the supply of electric power using the wireless system is performed. According to the first embodiment, it is possible to efficiently charge a vehicle when a disaster occurs.

Second Embodiment

Figure 4:
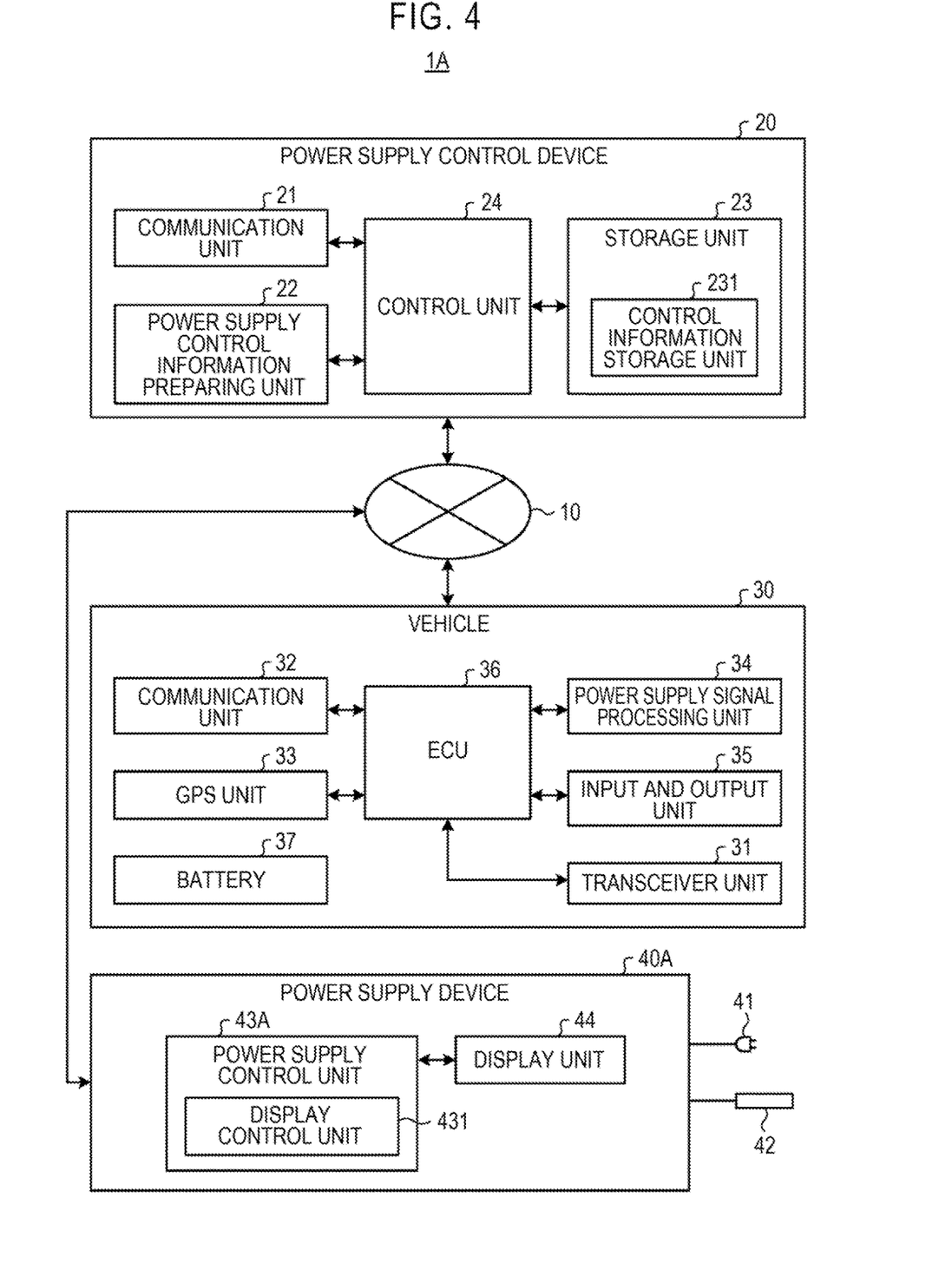
FIG. 4 is a block diagram illustrating a configuration of a power supply control system according to a second embodiment.

A second embodiment will be described below. FIG. 4 is a block diagram illustrating a configuration of a power supply control system according to the second embodiment. The power supply control system 1A according to the second embodiment includes a power supply device 40A instead of the power supply device 40 of the power supply control system 1 according to the first embodiment. Differences from the first embodiment (the configuration of the power supply device 40A and the process details of the power supply control system 1A) will be described below.

The power supply device 40A includes a wired power supply unit 41, a wireless power supply unit 42, a power supply control unit 43A, and a display unit 44. The power supply device 40A is constituted by one or more computers including a CPU, an FPGA, a ROM, and a RAM.

The power supply control unit 43A comprehensively controls the operations of the constituents of the power supply device 40A. When a disaster occurs and power supply control information for controlling supply of electric power in the disaster is received from the power supply control device 20, the power supply control unit 43A includes a display control unit 431 that controls display of the display unit 44 based on the power supply control information.

The display unit 44 includes a display and a speaker. The display unit 44 displays an image on the display under the control of the display control unit 431.

Figure 5:
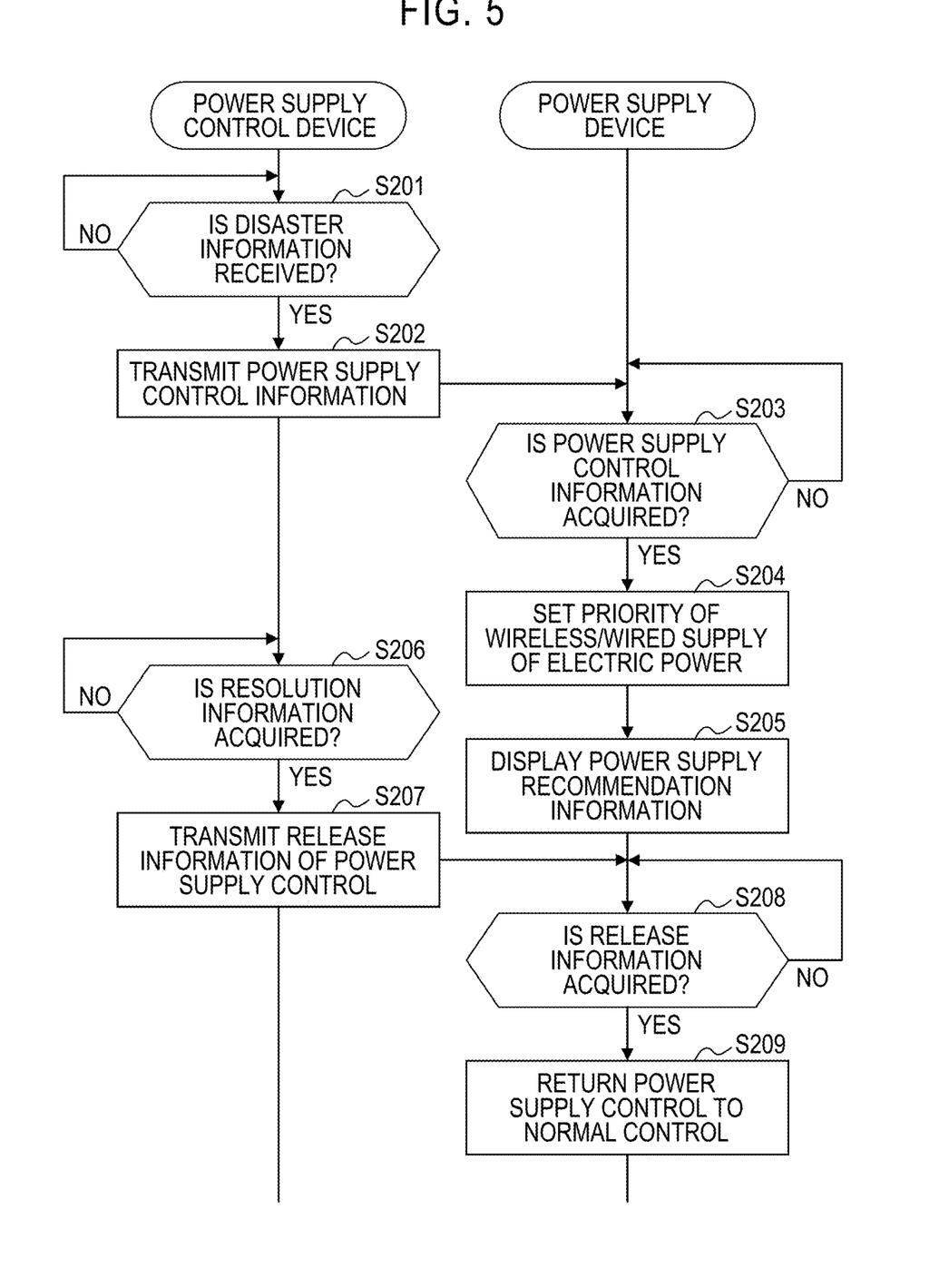
FIG. 5 is a sequence diagram illustrating a power supply control routine which is performed by the power supply control system according to the second embodiment.

A power supply control routine which is performed by the power supply control system 1A will be described below with reference to FIG. 5. FIG. 5 is a sequence diagram illustrating the power supply control routine which is performed by the power supply control system according to the second embodiment.

Similarly to Steps S101 to S104 in the flowchart illustrated in FIG. 3, when the power supply control device 20 acquires information on a disaster, power supply control information is transmitted to the power supply device 40A and the power supply device 40A performs a setting for prioritizing supply of electric power using a wired system (Steps S201 to S204).

Figure 6:
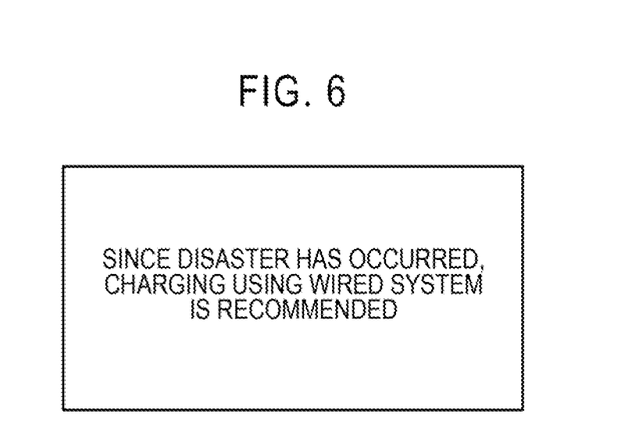
FIG. 6 is a diagram illustrating an example of an image which is displayed on a display provided in a power supply device according to the second embodiment.

After the setting for prioritizing the supply of electric power using a wired system has been performed, the power supply control unit 43A displays power supply recommendation information for recommending charging using the wired system on the display unit 44 (Step S205). FIG. 6 is a diagram illustrating an example of an image which is displayed on a display provided in a power supply device according to the second embodiment. For example, as illustrated in FIG. 6, charging using the wired system is recommended to a user of the vehicle 30 by displaying a wording "charging using a wired system is recommended due to occurrence of a disaster" on the display unit 44 (the display) of the power supply device 40A. Accordingly, a power supply process using the wired system is performed on the vehicle 30.

Figure 7:
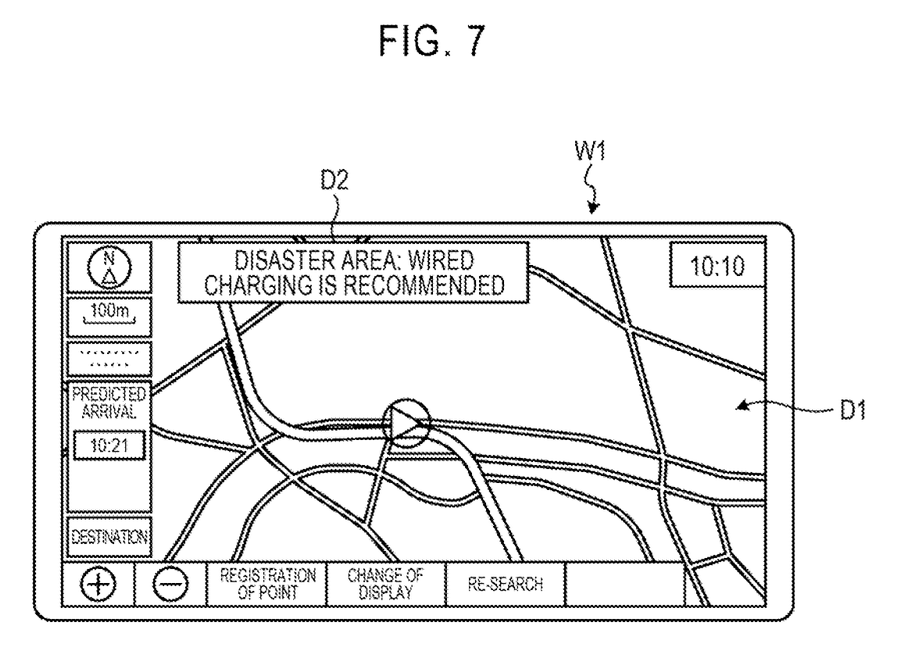
FIG. 7 is a diagram illustrating an example of an image which is displayed on a display provided in a vehicle according to the second embodiment.

At this time, the power supply control device 20 may display information for recommending the supply of electric power using the wired system on a display of the vehicle 30 which is traveling in a disaster area. FIG. 7 is a diagram illustrating an example of an image which is displayed on a display provided in a vehicle according to the second embodiment. For example, on a display screen W1 illustrated in FIG. 7, text information D2 is displayed to overlap a navigation image D1 including map information. The text information D2 includes information indicating that a current position at which the vehicle is traveling is in the disaster area and information on a recommended charging system. Through this display, a driver or the like of the vehicle 30 which is traveling in the disaster area is notified of the fact that the vehicle is traveling in the disaster area and the recommended charging system. The driver can perform charging using the recommended charging system when supply of electric power is performed in the disaster area.

Thereafter, the control unit 24 determines whether resolution information of the disaster has been received (Step S206). Here, when it is determined that the resolution information has not been received (Step S206: NO), the control unit 24 repeatedly ascertains whether the resolution information has been received. On the other hand, when it is determined that the resolution information has been received (Step S206: YES), the control unit 24 causes the routine to proceed to Step S207.

In Step S207, the control unit 24 transmits release information for releasing the power supply control due to the disaster to the power supply device 40A.

On the other hand, the power supply control unit 43A determines whether the release information has been received (Step S208). When it is determined that the release information has not been received (Step S208: NO), the power supply control unit 43A repeatedly ascertains whether the release information has been received. On the other hand, when it is determined that the release information has been received (Step S208: YES), the power supply control unit 43A causes the routine to proceed to Step S209.

In Step S209, the power supply control unit 43A restores the power supply control to a normal state and releases the control for prioritizing the wired system from the power supply device 40A.

According to the aforementioned second embodiment, it is possible to efficiently charge a vehicle by recommending charging using a wired system with high transmission efficiency of a power supply signal through display when a disaster occurs.

Third Embodiment

A third embodiment will be described below. A configuration of a power supply control system according to the third embodiment is the same as the configuration of the power supply control system 1A according to the second embodiment and thus description thereof will be omitted. Process details different from those in the second embodiment will be described below.

Figure 8:
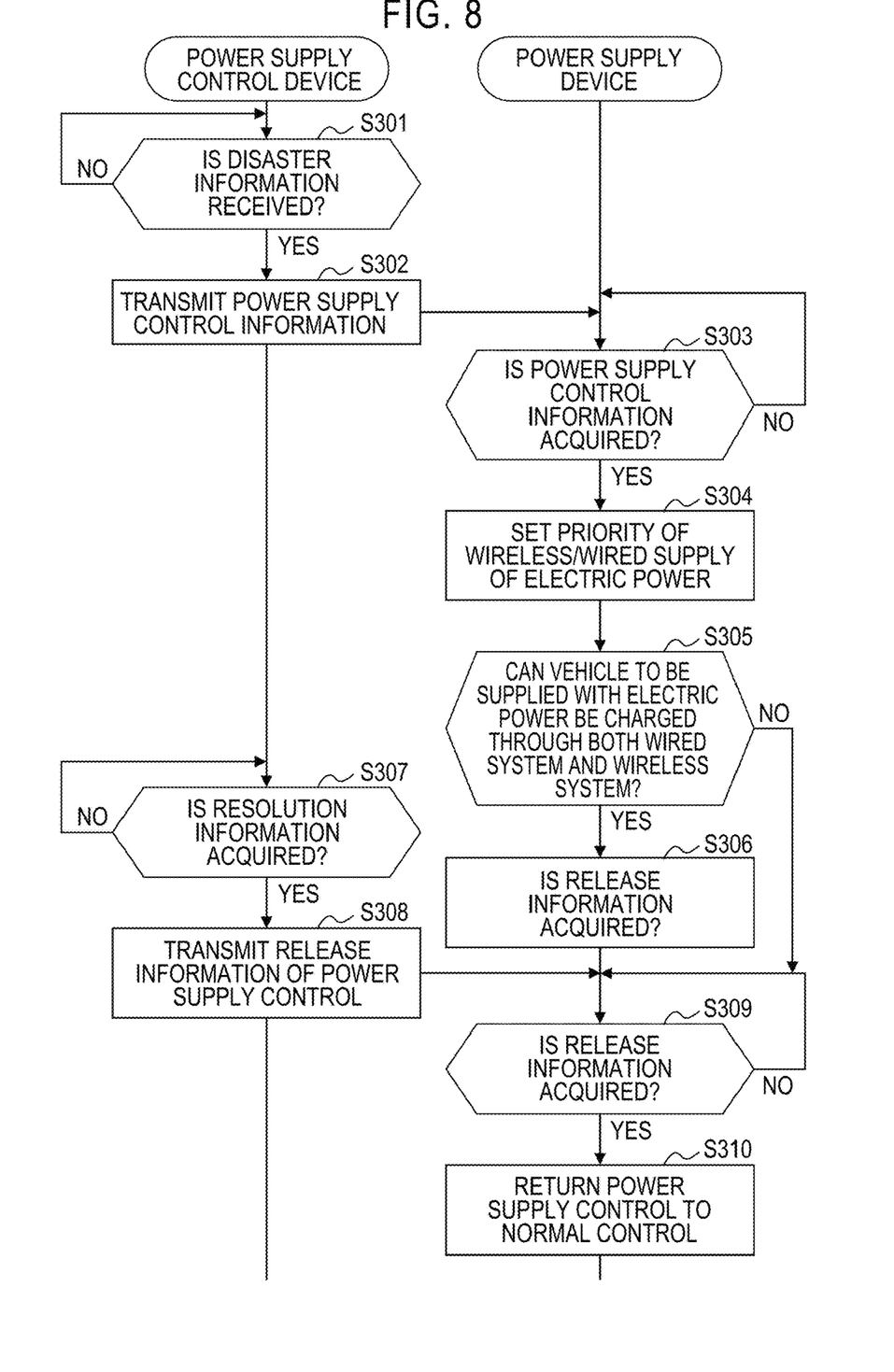
FIG. 8 is a sequence diagram illustrating a power supply control routine which is performed by a power supply control system according to a third embodiment.

FIG. 8 is a sequence diagram illustrating a power supply control routine which is performed by the power supply control system according to the third embodiment. Similarly to Steps S201 to S204 in the flowchart illustrated in FIG. 5, when the power supply control device 20 acquires information on a disaster, power supply control information is transmitted to the power supply device 40A and the power supply device 40A performs a setting for prioritizing supply of electric power using a wired system (Steps S301 to S304).

After a setting for prioritizing a wired system has been performed, the power supply control unit 43A determines whether a vehicle 30 to be supplied with electric power is able to be charged using both the wired system and the wireless system (Step S305). At this time, the power supply control unit 43A acquires information of the vehicle 30 from the vehicle 30 which is located in a power suppliable range from the power supply device 40A in a wireless or wired manner. When it is determined that the vehicle 30 to be supplied with electric power is able to be charged using only one of the wired system and the wireless system (Step S305: YES), the power supply control unit 43A causes the routine to proceed to Step S309. On the other hand, when it is determined that the vehicle 30 to be supplied with electric power is able to be charged using both the wired system and the wireless system (Step S305: NO), the power supply control unit 43A causes the routine to proceed to Step S306.

In Step S306, the power supply control unit 43A displays power supply recommendation information for recommending charging using the wired system on the display unit 44. For example, the information illustrated in FIG. 6 is displayed on the display unit 44. At this time, recommendation information (see FIG. 7) may be displayed on a display of the vehicle 30.

Thereafter, the control unit 24 determines whether resolution information of the disaster has been received (Step S307). Here, when it is determined that the resolution information has not been received (Step S307: NO), the control unit 24 repeatedly ascertains whether the resolution information has been received. On the other hand, when it is determined that the resolution information has been received (Step S307: YES), the control unit 24 causes the routine to proceed to Step S308.

In Step S308, the control unit 24 transmits release information for releasing the power supply control due to the disaster to the power supply device 40A.

On the other hand, the power supply control unit 43A determines whether the release information has been received (Step S309). When it is determined that the release information has not been received (Step S309: NO), the power supply control unit 43A repeatedly ascertains whether the release information has been received. On the other hand, when it is determined that the release information has been received (Step S309: YES), the power supply control unit 43A causes the routine to proceed to Step S310.

In Step S310, the power supply control unit 43A restores the power supply control to a normal state and releases the control for prioritizing the wired system from the power supply device 40A.

According to the aforementioned third embodiment, it is possible to efficiently charge a vehicle by recommending charging using a wired system with high transmission efficiency of a power supply signal when a disaster occurs.

In the third embodiment, an example in which recommendation information is displayed on the power supply device 40A is described above, but a configuration in which the power supply device 40A controls the power supply system may be employed as described above in the first embodiment.

In the first to third embodiments, an example in which the power supply device controls supply of electric power with reception of disaster information as a trigger is described above, but the disclosure is not limited to the disaster information and can also be applied to, for example, a case in which reservations for use of the power supply device are continuously made and a charging time required for each vehicle 30 is shortened.

Recording Medium

In an embodiment, a program that can perform the processing method of the power supply control system can be recorded on a recording medium which can be read by a computer or another machine or device (hereinafter referred to as a computer or the like). By causing a computer or the like to read and execute the program of the recording medium, the computer or the like serves as control units of the constituent devices of the power supply control system. Here, the recording medium which can be read by a computer or the like is a non-transitory recording medium which stores information such as data or a program by an electrical, magnetic, optical, mechanical, or chemical operation and which can be read by the computer or the like. Examples of a removable recording medium which can be detached from a computer or the like out of such recording media include a flexible disk, a magneto-optical disc, a CD-ROM, a CD-R/W, a digital versatile disk (DVD), a BD, a DAT, a magnetic tape, or a memory car such as a flash memory. Examples of a recording medium fixed to a computer or the like include a hard disk and a ROM. An SSD can be used as a recording medium which can be detached from a computer or the like and can also be used as a recording medium which is fixed to a computer or the like.

OTHER EMBODIMENTS

In the power supply control system according to any of the aforementioned embodiments, "unit" can be replaced with "circuit." For example, a communication unit can be replaced with a communication circuit.

A program which is executed by each device of the power supply control system according to any of the aforementioned embodiments may be stored in a computer connected to a network such as the Internet and may be provided by being downloaded via the network.

Other advantageous effects and modified examples can be easily derived by those skilled in the art. Broader aspects of the present disclosure are not limited to the same as described above and any specific details and any representative embodiment described above. Accordingly, the present disclosure can be modified in various forms without departing from the spirit or range of the comprehensive concept of the disclosure defined by the appended claims and equivalents thereof.

What is claimed is:

1. A power supply device that supplies electric power to a motor-driven vehicle including a power storage device through one of wireless supply of electric power using a wireless system and wired supply of electric power using a wired system, the power supply device comprising:
   a processor configured to perform control for recommending the supply of electric power using the wired system as a power supply system for the motor-driven vehicle when information on a disaster is received.

2. The power supply device according to claim 1, wherein the processor is configured to prioritize the supply of electric power using the wired system as the power supply system.

3. The power supply device according to claim 1, further comprising a display unit including a display,
   wherein the display unit is caused to display information for recommending the wired supply of electric power.

4. The power supply device according to claim 1, wherein the processor is configured to determine whether the motor-driven vehicle to be supplied with electric power from the power supply device is able to be charged through both the wireless supply of electric power and the wired supply of electric power and to perform control based on a result of the determination.

5. The power supply device according to claim 4, wherein the processor is configured to perform control for recommending the wired supply of electric power using the wired system when it is determined that the motor-driven vehicle is able to be charged through both the wireless supply of electric power and the wired supply of electric power.

6. The power supply device according to claim 1, wherein the processor is configured to release the control for recommending the wired supply of electric power using the wired system when resolution information of the disaster at a point at which the power supply device is located is transmitted.

7. A non-transitory computer readable storage medium storing instructions that are executable by a processor and that cause the processor of a power supply device to perform functions, the power supply device being a device that supplies electric power to a motor-driven vehicle including a power storage device through one of wireless supply of electric power using a wireless system and wired supply of electric power using a wired system, and the functions comprising:

control for recommending the supply of electric power using the wired system as a power supply system for the motor-driven vehicle when information on a disaster is received.

8. The non-transitory computer readable storage medium according to claim 7, wherein the processor is caused to prioritize the supply of electric power using the wired system as the power supply system.

9. The non-transitory computer readable storage medium according to claim 7, wherein the processor is caused to display information for recommending the wired supply of electric power on a display.

10. The non-transitory computer readable storage medium according to claim 7, wherein the processor is caused to determine whether the motor-driven vehicle to be supplied with electric power from the power supply device is able to be charged through both the wireless supply of electric power and the wired supply of electric power and to perform control based on a result of the determination.

11. The non-transitory computer readable storage medium according to claim 10, wherein the processor is caused to perform control for recommending the wired supply of electric power using the wired system when it is determined that the motor-driven vehicle is able to be charged through both the wireless supply of electric power and the wired supply of electric power.

12. The non-transitory computer readable storage medium according to claim 7, wherein the processor is caused to release the control for recommending the wired supply of electric power using the wired system when resolution information of the disaster at a point at which the power supply device is located is transmitted.

13. A power supply control system comprising:
a motor-driven vehicle that includes a power storage device; and
a power supply device that supplies electric power to the motor-driven vehicle through one of wireless supply of electric power using a wireless system and wired supply of electric power using a wired system and includes a processor configured to perform control for recommending the supply of electric power using the wired system as a power supply system for the motor-driven vehicle when information on a disaster is received.

14. The power supply control system according to claim 13, wherein the processor is configured to prioritize the supply of electric power using the wired system as the power supply system.

15. The power supply control system according to claim 13, wherein the processor includes a display unit including a display, and
wherein the display unit is caused to display information for recommending the wired supply of electric power.

16. The power supply control system according to claim 13, wherein the processor is configured to determine whether the motor-driven vehicle to be supplied with electric power from the power supply device is able to be charged through both the wireless supply of electric power and the wired supply of electric power and to perform control based on a result of the determination.

17. The power supply control system according to claim 16, wherein the processor is configured to perform control for recommending the wired supply of electric power using the wired system when it is determined that the motor-driven vehicle is able to be charged through both the wireless supply of electric power and the wired supply of electric power.

18. The power supply control system according to claim 13, wherein the processor is configured to release the control for recommending the wired supply of electric power using the wired system when resolution information of the disaster at a point at which the power supply device is located is transmitted.

19. The power supply control system according to claim 13, further comprising a power supply control device including a second processor configured to control the power supply device,
wherein the second processor displays information for recommending the supply of electric power using the wired system on a display of the motor-driven vehicle located in a disaster area.

20. The power supply control system according to claim 13, wherein the motor-driven vehicle includes an input and output unit that includes a display, and
wherein the display is caused to display information for recommending the wired supply of electric power.

* * * * *